UNITED STATES PATENT OFFICE.

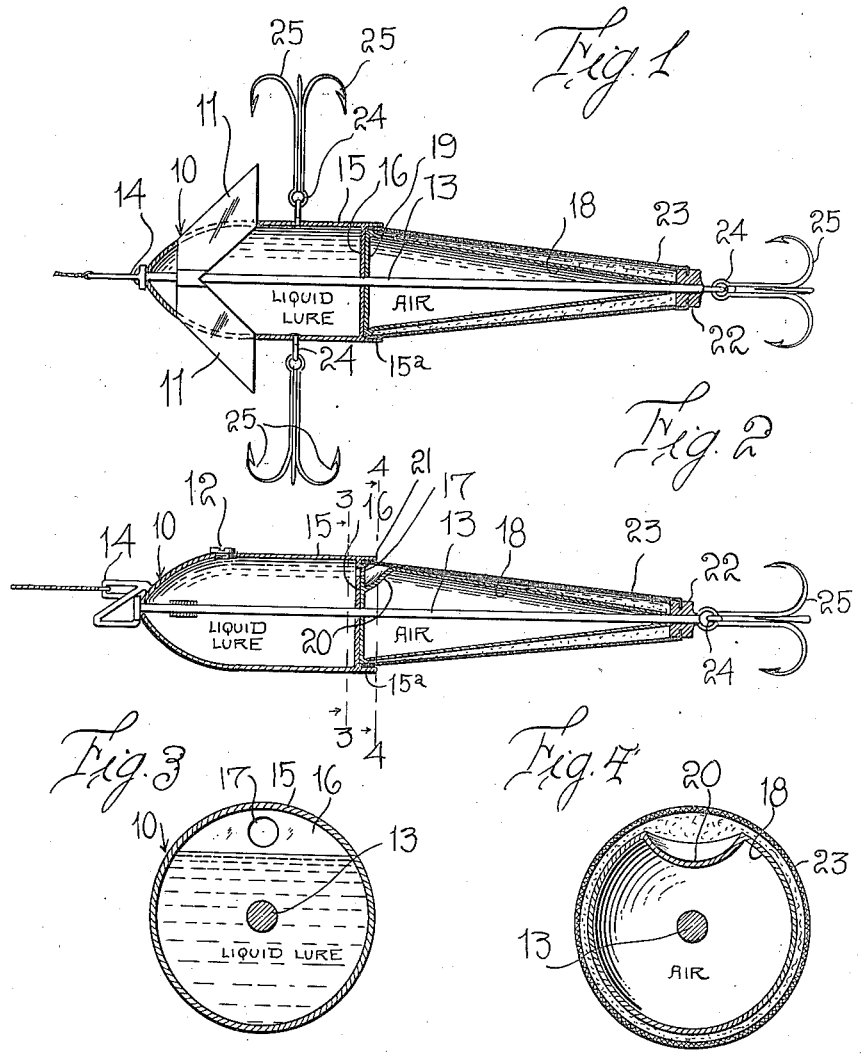

GEORGE A. RACE, OF CICERO, ILLINOIS.

ARTIFICIAL MINNOW.

1,249,194.  Specification of Letters Patent.  Patented Dec. 4, 1917.

Application filed April 14, 1917. Serial No. 162,064.

*To all whom it may concern:*

Be it known that I, GEORGE A. RACE, a citizen of the United States, residing at Cicero, in the county of Cook and State of Illinois, have invented certain new and useful Improvements in Artificial Minnows, of which the following is a specification, reference being had to the accompanying drawings.

This invention relates to fishing appliances, and particularly to minnows or other artificial bait.

The general object of my invention is to provide an artificial bait, which is hollow and adapted to contain a fish lure, and provide means whereby this fish lure may be discharged into the water as the bait is drawn through the water, thus attracting the fish to the bait.

Another object is to provide an absorbent casing for the rear portion of the minnow or bait, and provide means whereby the liquid contained within the hollow bait will be discharged onto this absorbent casing whenever the bait is drawn from the water, said means preventing the lure from being discharged onto the absorbent material at other times.

Other objects will appear in the course of the following description.

My invention is illustrated in the accompanying drawings, wherein:—

Figure 1 is a longitudinal sectional view through my improved artificial bait, the section being in a horizontal plane;

Fig. 2 is a longitudinal section on a vertical plane;

Figs. 3 and 4 are sections on the lines 3—3 and 4—4 of Fig. 2.

Referring to these figures, it will be seen that the artificial bait is in the form of a minnow. As shown, the minnow consists of an integral head and body portion, designated 10, and preferably made of metal, the head being approximately conical in form and provided with the laterally extending guide fins 11. The head is hollow to provide a container for liquid lure and I have provided an opening in the head or body portion, through which the lure may be filled into the interior of the head and body portion, this opening being shown as closed by a screw plug 12. Passing longitudinally through the head and body portion is a rod 13, which extends through the nose of the bait and has attached thereto the eye 14, to which the line is adapted to be fastened. This eye 14 is of such form that it will regulate the depth of the bait below the surface of the water. The rear end wall 16 of the chamber 15 formed within the head and body 10 is provided with a discharge opening 17, which is located adjacent the upper surface of the minnow or hollow bait. The tail of the minnow is formed of an approximately conical shell, preferably metal, designated 18, the forward end of this shell being closed by a wall 19. It will be seen that the side wall of the chamber 15 extends slightly beyond the conical shell 18 and over the end of the bag or casing which is attached to the base of the tail, as will be later stated. At one point, this shell 18 is inwardly deflected as at 20 and at this point the wall 19 is formed with an opening 21, which is adapted to register with the opening 17. Mounted upon the longitudinally extending rod 13, at the extreme rear end thereof, is a collar 22 and attached to this collar or base is an approximately conical bag or casing 23 of absorbent textile material. This bag or casing extends toward the body and is attached to the base of the tail portion in any suitable manner, this bag or casing extending over the deflected portion 20 of the shell 18. Extending from the body 10 are eyelets 24 for the attachment of hooks 25 and one of said eyelets 24 is attached to the extreme rear end of the rod 13 for the purpose of attaching a hook 25 thereto.

In the practical use of this invention, the chamber 15 is to be filled, or partly filled, with a liquid fish lure, such as sweet oil and aniseed powder. Any other kind of liquid fish lure, however, may be used. The plug 12 is then disposed in the filling opening and the bait is ready for use. Now when the bait hangs vertically, as when the bait is lowered into or raised from the water, the fish lure will pass out through the openings 17 and 21 and be directed by the deflected portion 20 onto the absorbent bag or casing 23. The fish lure will be absorbed by this casing and this will leave a streak of fish lure behind the bait, as the bait is pulled through the water. The liquid fish lure will not pass out of the chamber again, however, until the bait is raised from the water, so that while the bait is actually in the water, the fish lure contained within the chamber 15 is not being exhausted. It will thus be seen that the absorbent material 23 is only intermittently moistened with the fish lure and thus there is no waste. When the bait is being pulled through the water, the openings 17 and 21 will be disposed adjacent the uppermost portion of the bait and above the level of the liquid fish lure within the chamber 15. The fish lure may be filled into the chamber 15, by means of an oil can and it is, of course, obvious that the chamber may be nearly entirely filled or only partially filled, as the necessities of any case require. Preferably the body portion and head of the minnow are painted, as for instance light green, or any other desired color, and the fabric 23 is dyed any desired color.

While I have illustrated a particular form of my invention, I do not wish to be limited thereto, as it is obvious that the invention may be modified in many different forms.

Having described my invention, what I claim is:—

1. An artificial bait for fishing having a chamber for containing liquid fish lure, a member composed of absorbent material disposed at the rear portion of the bait, the rear wall of said chamber having an opening through which the fish lure may be discharged upon said absorbent member.

2. In an artificial bait, a chamber for containing fish lure, an absorbent member carried at the rear of the bait, said chamber having an opening adjacent the upper surface of the bait, said opening discharging fish lure upon the absorbent member when the bait is disposed in an approximately vertical position.

3. An artificial bait formed with a chamber for containing fish lure and having a tail portion, and a casing for the tail portion formed of absorbent material, the rear wall of the chamber being formed with a perforation whereby the fish lure may be discharged upon said casing.

4. In an artificial bait, a chamber having a perforated rear wall, a tail portion rearward of the chamber, a casing of absorbent fabric disposed around the rear portion of the bait, said chamber having a perforation adjacent the upper surface of the bait when the bait is horizontal, and discharging within the casing when the bait is raised to an approximately vertical position.

5. An artificial bait formed with a head portion and a conical tail portion, the head being hollow to provide a chamber for containing liquid lure, and the tail portion being hollow to provide an air chamber, a conical casing of absorbent material disposed around the tail portion, the rear wall of the head being formed with a perforation adjacent the upper surface of the bait and discharging within said absorbent casing.

6. An artificial minnow having a hollow head and a hollow conical tail, the hollow head forming a chamber for the reception of fish lure, the hollow tail forming an air chamber, a rod extending entirely through the head and the tail and having a collar bearing against the rear end of the tail, and a conical casing of absorbent material attached at its smaller end to said collar and at its forward end to the forward wall of the tail, the rear wall of the head and the forward wall of the tail being formed with registering openings being disposed adjacent the upper surface of the minnow when the latter is horizontal, said openings discharging within the absorbent casing, the tail portion having its wall inwardly deflected adjacent the opening in the end of the tail portion.

In testimony whereof I hereunto affix my signature in the presence of two witnesses.

GEORGE A. RACE.

Witnesses:
Monte M. Aaron,
Silas E. Warren.